United States Patent
Avalos et al.

(10) Patent No.: US 6,288,747 B1
(45) Date of Patent: Sep. 11, 2001

(54) MULTICHANNEL TELEVISION SOUND STEREO AND SURROUND SOUND ENCODER SUITABLE FOR USE WITH VIDEO SIGNALS ENCODED IN PLURAL FORMATS

(75) Inventors: Sealtiel Avalos, Dallas; Robert D. Kaylor, Rowlett; Robert F. Kessler, Dallas, all of TX (US)

(73) Assignee: Cable Electronics, Inc., Houston, TX (US)

( * ) Notice: Subject to any disclaimer, the term of this patent is extended or adjusted under 35 U.S.C. 154(b) by 0 days.

(21) Appl. No.: 09/150,465

(22) Filed: Sep. 9, 1998

Related U.S. Application Data

(63) Continuation-in-part of application No. 08/918,754, filed on Aug. 25, 1997.

(51) Int. Cl.$^7$ ...................................................... H04N 7/04
(52) U.S. Cl. ........................ 348/485; 348/484; 348/738; 348/705; 381/106; 386/94
(58) Field of Search .................................... 348/485, 484, 348/483, 482, 480, 481, 736, 738, 705, 555; 381/106, 22, 18, 13, 2, 81, 123; 386/94; H04N 7/04

(56) References Cited

U.S. PATENT DOCUMENTS

| | | | |
|---|---|---|---|
| 4,048,654 | * 9/1977 | Wegner | 358/144 |
| 4,139,866 | 2/1979 | Wegner | 348/485 |
| 4,405,944 | * 9/1983 | Eilers et al. | 358/144 |
| 4,661,851 | 4/1987 | Muterspaugh | 381/106 |
| 4,674,122 | * 6/1987 | Orban | 381/13 |
| 4,704,727 | 11/1987 | Beard | 381/13 |
| 4,716,589 | 12/1987 | Matsui | 381/3 |
| 4,752,955 | * 6/1988 | Torick et al. | 381/13 |
| 4,771,464 | * 9/1988 | Kadin et al. | 381/13 |
| 4,803,553 | * 2/1989 | Schrock et al. | 358/149 |
| 5,119,503 | * 6/1992 | Mankovitz | 455/45 |
| 5,289,288 | * 2/1994 | Silverman et al. | 358/335 |
| 5,349,386 | * 9/1994 | Borchardt et al. | 348/485 |
| 5,373,562 | 12/1994 | Albean | 381/13 |
| 5,377,272 | 12/1994 | Albean | 381/13 |
| 5,602,922 | 2/1997 | Lee | 381/18 |
| 5,610,985 | 3/1997 | Ten Kate | 381/27 |
| 5,619,577 | 4/1997 | Hasler | 381/14 |
| 5,748,842 | * 5/1998 | Holmes et al. | 395/2.79 |
| 5,825,968 | * 10/1998 | Nishigaki et al. | 386/94 |
| 6,097,558 | * 8/2000 | Oguro | 360/22 |

OTHER PUBLICATIONS

Williams, Edmund A., Section 3: Transmitters "3.6 Multichannel Television Sound," NAB Engineering Handbook, Copyright 1992, pp. 553–568.

* cited by examiner

Primary Examiner—Reinhard J. Eisenzopf
Assistant Examiner—Jean W. Désir
(74) Attorney, Agent, or Firm—Haynes and Boone, LLP

(57) ABSTRACT

Method and apparatus for generating a composite audio signal clocked to a selected frequency from left and audio input signals. A video/audio signal generator transmits the left and right audio input signals, together with a video signal having a horizontal synchronization signal embedded therein. If copy protection has not been applied to the video signal, the embedded horizontal synchronization signal will have a frequency of 15.734 KHz. If applied to the video signal, copy protection techniques will shift the frequency of the horizontal synchronization signal. To avoid distortion of the composite audio signal, a switch configured to selectively couple the video signal or a secondary video signal generated by an internal video signal generator to an audio signal processor which generates the composite audio output signal from the left and right audio input signals. Embedded within the secondary video signal is a horizontal synchronization signal having a frequency of 15.734 KHz. Thus, if copy protection features cause the frequency of the signal embedded within the primary video signal to shift, the switch may be used to couple the audio signal processor to the internal video signal generator, thereby ensuring that the composite audio signal will always be clocked to the selected frequency.

9 Claims, 3 Drawing Sheets

MULTICHANNEL TELEVISION SOUND STEREO AND SURROUND SOUND ENCODER SUITABLE FOR USE WITH VIDEO SIGNALS ENCODED IN PLURAL FORMATS

CROSS REFERENCE TO RELATED APPLICATION

This application is a Continuation-in-Part of U.S. patent application Ser. No. 08/918,754 filed Aug. 25, 1997, entitled "Multichannel Television Sound Stereo and Surround Sound Encoder", assigned to the Assignee of the present application and hereby incorporated by reference as if reproduced in its entirety.

BACKGROUND OF THE INVENTION

1. Field of the Invention

The invention generally relates to encoders for transmitting audio information formatted in accordance with the multichannel television sound (or "MTS") standard in "surround sound" and, more particularly, relates to encoders for "surround sound" transmission of modified MTS formatted audio information.

2. Description of Related Art

The MTS standard governs the transmission of audio information to televisions. In accordance with this standard, audio information is carried in two signals, the L-R signal and the L+R signal. The L-R signal, which represents the difference between left (or "L") and right (or "R") channels, carries stereo information within a first frequency band and surround sound information within a second, higher, frequency band. Due to signal attenuation and noise considerations, most devices used today to deliver audio information to a television are unable to successfully transmit the surround sound information contained in the L-R band to the television. Thus, in our prior application, U.S. patent application Ser. No. 08/918,754 filed Aug. 27, 1997, we disclosed a modulator, a device which is coupled between the video and audio signal generator and the television, which enables the transmission of surround sound information to an audio reproduction device associated with the television.

While it is contemplated that the video and audio signals to be transmitted to the television may be generated by a wide variety of devices, one such device is a digital video disc (or "DVD") player which reads video and audio information encoded onto the surface of a DVD and transmits the information to the television. However, because the DVD player produces video images of very high quality, the motion picture industry has long expressed concern that DVD players could be used to produce unauthorized copies of movies of quality comparable to the originals. As a result, DVD players are equipped with a copy protection feature commonly referred to as "Macrovision DVD copy protection". When a copy protected DVD disc is played back, the DVD player varies the format of the encoded video signal to create a series of modifications thereto. These signal modifications are designed to be transparent on original program viewing. However, they cause unauthorized copies made on video cassette recorders (or "VCRs") to be substantially degraded.

Copy protection techniques which create modifications to the video signal have, however, produced certain undesirable side effects. Specifically, the modulators used to enable the transmission of surround sound to televisions use the video signal to synchronize the audio signal being processed thereby. However, the aforementioned copy protection techniques typically modify the frequency of the horizontal synchronization signal embedded within a video signal. For example, the Macrovision DVD copy protection technique raises the frequency of the video signal from 15.734 KHz to 15.790 KHz. The resulting clocking error produces a significant amount of distortion in the audible sound reproduced using the audio signal output through the modulator.

Thus, what is needed is a device which is both capable of transmitting surround sound information to a television while preventing the copy protection feature of the signal generator from distorting the audio signal transmitted thereby. It is, therefore, the object of the invention to provide such a device.

SUMMARY OF THE INVENTION

In one embodiment, the present invention is of an audio adapter for coupling a video/audio signal generator to an audio reproduction system. The audio adapter includes a first audio input, a second audio input and a video input for coupling the audio adapter to the video/audio signal generator and an audio output which couples the audio adapter to the audio reproduction system. The audio adapter further includes an audio signal processor which generates a composite audio signal clocked to a selected frequency from a left audio signal received from the first audio input and a right audio signal received from the second audio input. To clock the composite audio signal to the selected frequency, the audio signal processor uses either a first signal embedded within a primary video signal received from the video/audio signal generated at the video input or a second signal embedded within a secondary video signal generated by an internal video source. A switch selectively couples either the video input or an output of the internal video signal source to the audio signal processor. The audio signal processor clocks the composite audio signal to the frequency of the first signal when the video input is coupled to the audio signal processor and clocks the composite audio signal to the frequency of the second signal when the internal video source is coupled to the audio signal processor.

In one aspect of the invention, the frequency of the second signal is 17.734 KHz, the frequency of the horizontal synchronization signal for video signals to which copy protection has not been applied. If the primary video signal is not copy protected, the audio signal processor will clock the composite audio signal to the frequency of the horizontal synchronization signal embedded therein. If, however, the primary video signal has been copy protected, the frequency of the horizontal synchronization signal embedded therein will have been shifted, for example, to 17.890 KHz. In such circumstances, the switch is used to couple the internal video signal generator to the audio signal processor, thereby ensuring that the composite audio signal will always be clocked to a selected frequency, for example, 17.734 KHz.

BRIEF DESCRIPTION OF THE DRAWINGS

The invention will be better understood, and its numerous features and advantages will become apparent to those skilled in the art, by reference to the following drawings, in which.

DETAILED DESCRIPTION OF A PREFERRED EMBODIMENT

Figure 1:
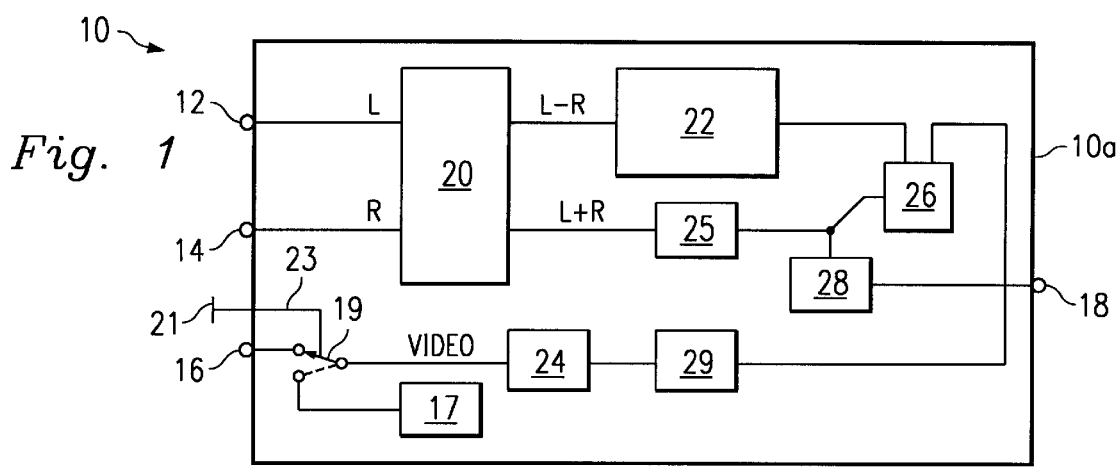
FIG. 1 is a block diagram of an MTS stereo/surround sound encoder constructed in accordance with the teachings of the present invention.

Referring first to FIG. 1, a MTS stereo/surround sound encoder 10 constructed in accordance with the teachings of the present invention will now be described in greater detail. The encoder 10 includes a protective housing 10a within which plural electronic components are housed. For example, the electronic components of the encoder 10 may reside on a printed circuit board (or "PCB") supportably mounted in the interior of the housing 10a. External connections, for example, plug connectors, supportably mounted in apertures formed in the housing 10a, which enable external coupling to various ones of the internally housed electronic components of the encoder 10 include a left audio input 12, a right audio input 14, a video input 16 and an audio output 18.

The electronic components of the encoder 10 which reside on the PCB supportably mounted within the housing 10a include an audio breakout matrix (or "ABM") 20, a surround sound conditioner (or "SSC") 22, a video stripper matrix (or "VSM") 24, a L+R low pass clamping filter 25, a mixer 26, an amplifier circuit 28, and a timing circuit 29. As will be more fully described below, first and second audio signals are input the ABM 20 via the left audio input 12 and the right audio input 14, respectively, a video signal is input the VSM 24 via the video input 16 and a processed audio signal is output the amplifier circuit 28 via the audio output 18.

As will also be more fully described below with respect to FIGS. 2–5, the encoder 10 utilizes first and second pilot signals, each operating at a respective frequency, to properly clock the processed audio signal output the audio output 18. To produce the first and second pilot signals, the VSM 24 is coupled to the video input 16 to receive a composite video signal from the video source. The VSM 24 strips the horizontal synchronization (or "HSYNC") signal from the composite video signal and propagates the HSYNC signal to the timing circuit 29 where the first and second pilot signals are produced in a manner to be more fully described below. The frequency of the first pilot signal, which is used to synchronize the encoder 10, is 15.734 KHz—which matches the frequency of the HSYNC signal—while the frequency of the second pilot signal, which is used to synchronize the transfer of the L–R signal, is twice the frequency of the HSYNC signal, or 31.468 KHz.

To ensure that the VSM 24 receives a video signal which contains a HSYNC signal having a frequency of 15.734 KHz, the encoder 10 further includes a video signal generator 17 which may be selectively coupled to the input of the VSM 24 by a switch 19. If the video source coupled to the VSM 24 via the video input 16 is supplying a standard composite video signal, the video signal is propagated on to the VSM 24. As used herein, the term "standard composite video signal" is intended to refer to any encoded video signal having, as one component thereof, a HSYNC pulse sequence having a frequency of 15.734 KHz. If, however, the video source coupled to the VSM 24 via the video input 16 is supplying a non-standard composite video signal, the switch 19 is moved from a first position to a second position, shown in phantom in FIG. 1, for example, by depressing an exteriorly located pushbutton 21 coupled to the switch 19 by linkage 23. As used herein, the term "non-standard composite video signal" is intended to refer to a video signal encoded in any format in which one component of the video signal is a HSYNC pulse sequence having a frequency other than 15.734 KHz. By moving the switch 19 into the second position, the video signal generator 17 will then supply the VSM 24 with a secondary video signal containing a HSYNC signal having a frequency of 15.734 KHz. Of course, as the remainder of the secondary video signal is stripped away by the VSM 24, apart from the requirement that it contain an HSYNC signal having the requisite frequency, the precise composition of the secondary video signal is unimportant. Thus, for example, the secondary video signal may be a relatively simple "blue screen" signal.

In the embodiment of the invention disclosed herein, it is contemplated that the secondary video signal generator 17 be supportably mounted within the housing 10 where the other electronic components of the encoder 10 reside. Alternately, the secondary video signal generator may reside on a separate board within the shared housing 10a or, if space considerations permit, may reside on the same board with the ABM 20, the SSC 22, the VSM 24, the L+R low pass clamping filter 25, the mixer 26, the amplifier circuit 28 and the timing circuit 29.

As disclosed herein, switching between the video signal source coupled to the video input 16 and the secondary video signal source 17 is accomplished by depression of the pushbutton 21. In this embodiment, the user would first begin propagation of video and audio signals to the encoder 10, for example, by initiating a playback of a DVD using a DVD player having audio (L), audio (R) and video outputs coupled to the L, R and video inputs 12, 14 and 16, respectively. If the DVD was copy protected, for example using Macrovision DVD copy protection techniques, the user would depress the pushbutton 21, thereby disconnecting the video input 16 from the VSM 24 and connecting the secondary video signal source 17 to the VSM 24. Of course, the video signal output the DVD player would have a separate connection to the television for delivery of the video signal thereto.

While, in the embodiment of the invention disclosed herein, switching between the primary video signal source and the secondary video signal source is performed whenever the operator of the video signal generator is informed that the video signal being generated is equipped with Macrovision copy protection, it should be clearly understood that the present invention is equally suitable for use whenever the horizontal synchronization signal of the composite video signal generated by the primary video signal source is modified. For example, it is contemplated that other copy protection techniques would result in other modifications to the frequency of the HSYNC signal.

Figure 2:
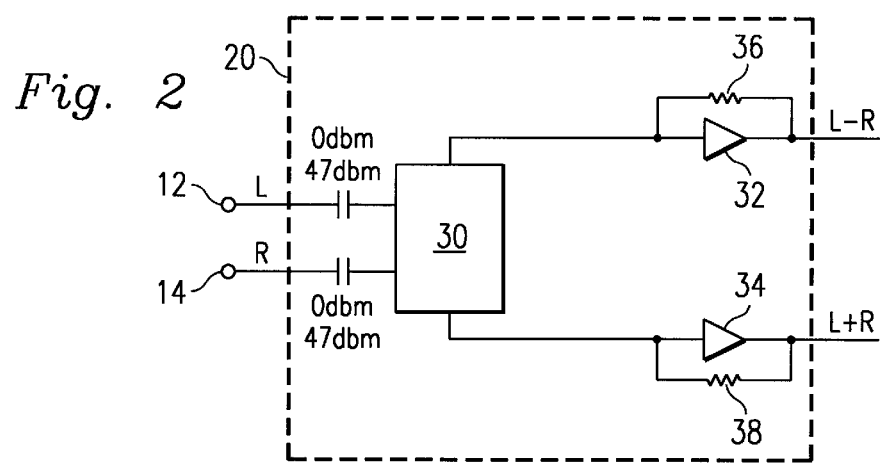
FIG. 2 is an expanded block diagram of a first section of the encoder of FIG. 1.

In FIG. 2, the ABM 20 is shown in greater detail. The ABM 20 receives a left audio input signal and a right audio input signal at the left audio input 12 and the right audio input 14, respectively, from the DVD player. The input signals are matrixed by a resistor network 30. The resistor network 30 has a plurality of resistors, each resistors has a value of approximately 100 KΩ, generates stereo information and surround sound information, collectively referred to as the L–R signal, and monaural information, referred to as the L+R signal. Use of large resistors in the resistor network 30 causes attenuation in the signals. Therefore, audio amplifiers for the L−R and the L+R signals, designated 32 and 34 respectively, return the levels of the signals to normal. Resistors 36 and 38 are selected in conjunction with the amplifiers 32 and 34, respectively, to produce the desired amplification of the signals. The L+R signal is transmitted through the L+R low pass clamping filter 25 and the amplifier circuit 28 to the output 18. The L+R low pass clamping filter 25 is a low pass filter (or "LPF") that will clamp the signal at 15.734 KHz and at 31.468 KHz to prevent interference with the pilot signals operating at 15.734 KHz and 31.468 KHz. The L−R signal output of the ABM 20 is transmitted to the SSC 22.

Figure 3:
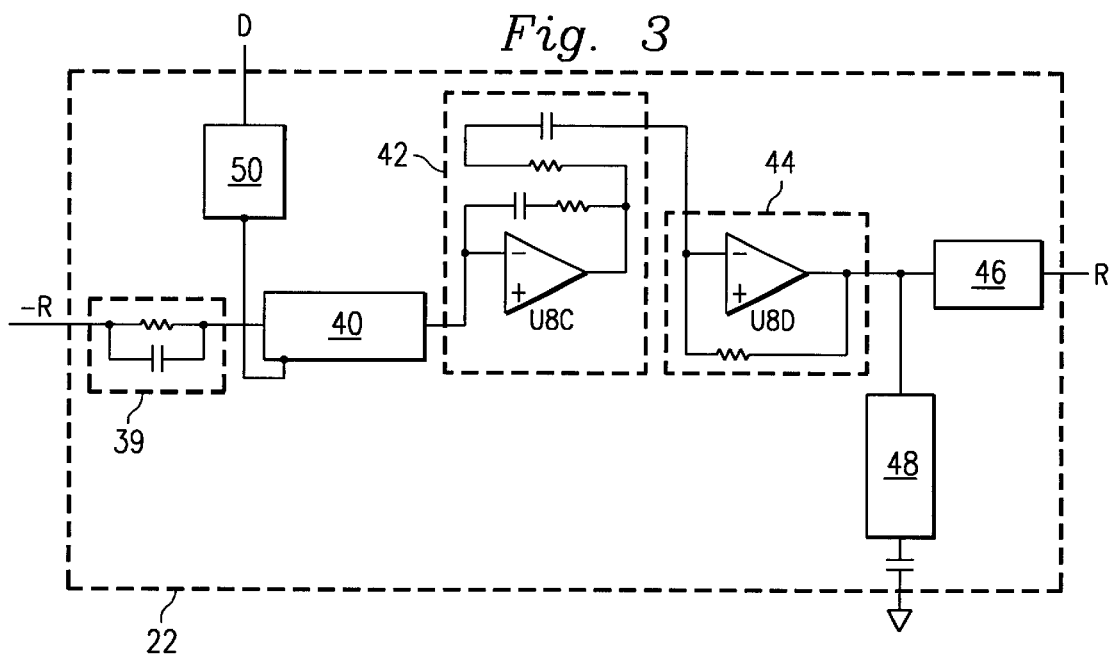
FIG. 3 is an expanded block diagram of a second section of the encoder of FIG. 1.

As shown in FIG. 3, the SSC 22 includes a pre-emphasizer 39, a Dolby noise reduction (or "dbx") compander 40, a low pass (or "LP") filter network 42, a regeneration amplifier 44, an L−R clamping filter 46, and a diode circuit 48. The L−R signal is received at the SSC 22. The pre-emphasizer 39 operates at 396 psec. The pre-emphasizer 39 is used to condition the L−R signal for the dbx compander 40. In operation, the pre-emphasizer 39 gives higher frequencies of the L−R signal the same power as lower frequency of the L−R signal. The higher frequencies need a boost in power because the lower frequencies travel much easier due to Doppler effects. Thus, the surround sound information contained at the higher frequencies of the L−R signal now has more power. The pre-emphasized signal is then sent to the dbx compander 40. The dbx compander 40 amplitude compresses the L−R signal according to the MTS standard. Amplitude compression is used to reduce the signal-to-noise (or "SNR") ratio. Amplitude compression is performed by routing the output of the L−R clamping filter 46 through a transistor buffer stage 54 (FIG. 4) through a constant current circuit 50 and to the dbx compander 40. The constant current circuit 50 is a root-mean-square (RMS) stage of the dbx compander 40, which controls the amplitude of the L−R signal.

The output L−R signal of the compander 40 is passed through the LP filter network 42. The LP filter network 42 filters out any unwanted noise to produce a filtered L−R signal. The LP filter network 42 attenuates the original L−R signal during the filter process so that the filtered L−R signal will be slightly attenuated. Therefore, the filtered L−R signal is passed through the amplifier 44. The amplifier 44 returns the filtered L−R signal back to the proper signal level. At this point, the filtered L−R signal must be clamped off at 15.734 KHz and 31.468 KHz frequencies to prevent interference with the pilot signals. The L−R clamping filter 46 is used to clamp the signals at 15.734 KHz and 31.468 KHz frequencies. The L−R clamping filter 46 will trap the signal to create about 45 DB roll-off at 15.734 KHz and 31.468 KHz frequencies. The L−R clamping filter 46 effectively traps the L−R signal, at 15.734 KHz, to ground and prevents the 15.734 KHz pilot signal from taking hits. likewise, the L−R clamping filter 46 traps any switching signal contained in the L−R signal at 31.468 KHz to ground to provide clean stereo/surround sound output. Thus, the information signal will be reduced to minimal levels and will not interfere with or allow the pilot signal to take hits. In addition to clamping the filtered L−R signal at the 15.734 KHz and 31.468 KHz frequencies, voltage spikes in the filtered L−R signal must be eliminated. The diode circuit 48 eliminates voltage spikes by leveling off voltage spikes so the peak-to-peak (P-P) voltage does not exceed 1.4 volts. The diode circuit 48 will take the filtered L−R signal and produce a leveled L−R signal. The leveled L−R signal will have the frequencies clamped off at the two frequencies 15.734 KHz and 31.468 KHz.

Figure 4:
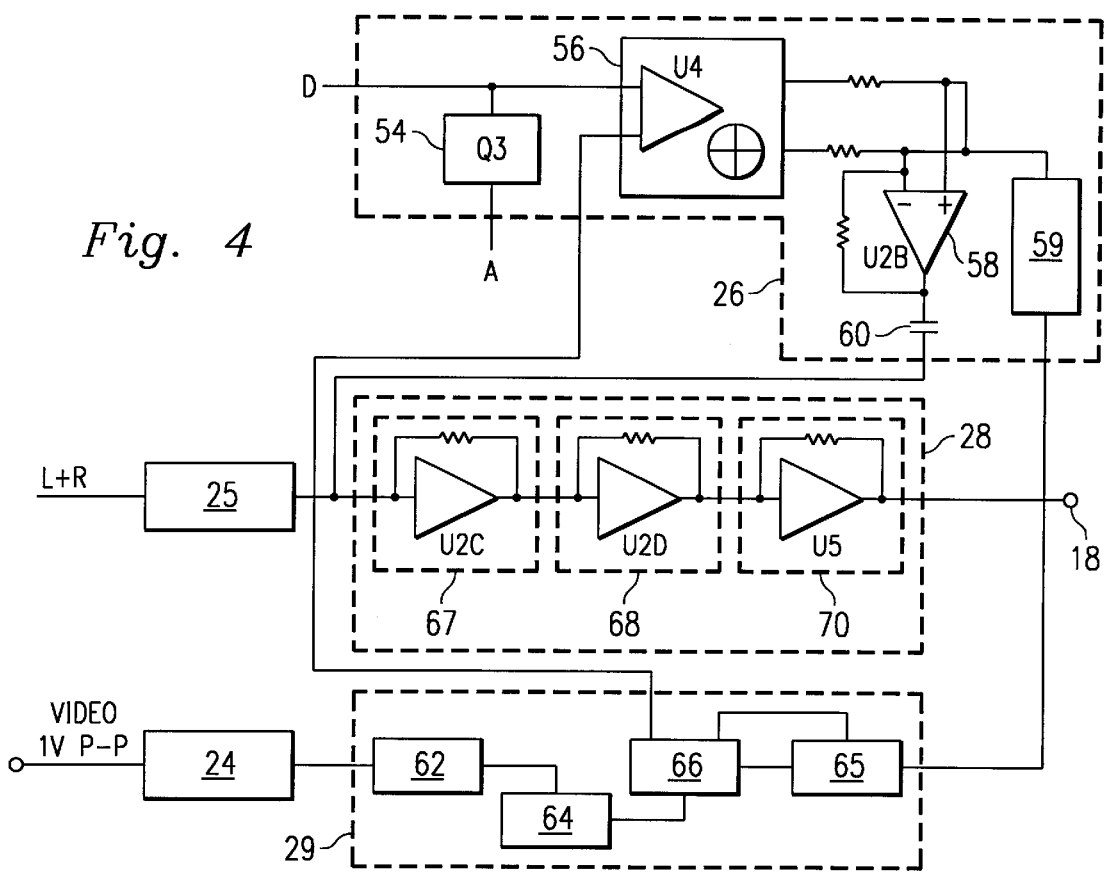
FIG. 4 is an expanded block diagram of a third section of the encoder of FIG. 1.

FIG. 4 shows the VSM 24, the L+R low pass clamping filter 25, the mixer 26, the amplifier circuit 28, the timing circuit 29, and the transistor buffer stage 54. As discussed above, the output of the L−R clamping filter 46 is sent to the transistor buffer stage 54. The output of the transistor buffer stage 54 is inputted to a balance modulator 56. The balance modulator 56 modulates the leveled L−R signal to produce an upper side band and a lower side band, around the pilot signal at the 31.468 KHz switching rate, as a reduced carrier amplitude modulated (AM) L−R signal. The switching rate of 31.468 KHz for the balance modulator 56 is produced by the ting circuit 29 as discussed below. A combining amplifier 58 blends the AM L−R signal output of the balance modulator 56 with the pilot signal at 15.734 KHz to produce a mixed L−R signal. Timing for the pilot signal at 15.734 KHz is produced by the modulator timing circuit 59. The modulator timing circuit 59 is synchronized to the 15.734 KHz rate of the television, which is produced by a synchronizing circuitry.

The synchronization circuitry synchronizes the switching rate at 31.768 KHz with the pilot signal at 15.734 KHz. The synchronization circuitry is made up of the VSM 24 and the timing circuit 29. The VSM 24 removes color or chroma information from a video signal to produce a luminous video pattern signal. The luminous video pattern signal is used to keep the encoder 10 (FIG. 1) in sync with the 15.734 KHz horizontal rate of the television. The luminous video pattern signal is sent to a synchronous separator 62. The synchronous separator 62 looks only at the 15.734 KHz horizontal rate to produces a clean HSYNC signal. The HSYNC signal is sent to a JK flip-flop 64. The JK flip-flop 64 produces a "saw" like signal pattern which drives a phase lock loop (or "PLL") 66 at a switching rate of 31.468 KHz. The PLL 66 in turn provides the 31.468 KHz switching rate to the balance modulator 56. Also, a JK flip-flop 65 provides the 15.734 KHz timing for the modulator timing circuit 59. Thus, the timing circuit 29 produces the sync signal that keeps the pilot signal at 15.734 KHz in sync with the pilot signal at 31.468 KHz switching rate. Accordingly, the balance modulator 56 is switched at 31.468 KHz in step with the pilot signal at 15.734 KHz to produce the AM L−R signal in step with the horizontal rate of the television.

The mixed L−R signal output of the combining amplifier 58 is sent through a capacitor 60 to the amplifier circuit 28. A output amplifier 67 receives the mixed L−R signal and the L+R signal. The output amplifier 67 amplifies the mixed L−R signal and the L+R signal to produce a amplified output signal. The amplified output signal is sent to a variable gain amplifier 68 to produce a composite output signal. The composite output signal is sent through a buffer stage 70, which reduces loading, to the output 18.

Figure 5:
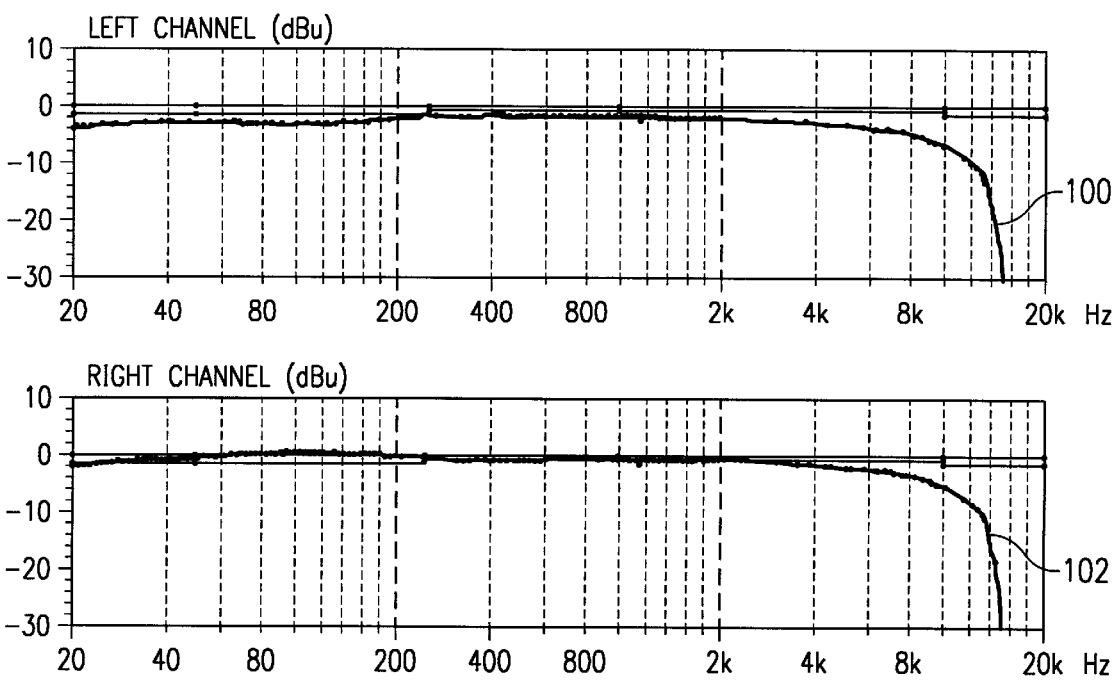
FIG. 5 is a graph illustrating the signal-to-noise ratio of the encoder of FIG. 1.

In operation, and as shown in FIG. 5, the encoder 10 prevents excessive attenuation or roll-off at the higher frequencies. The vertical scale of the graph represents the signal attenuation in dBu and the horizontal scale represents the frequency in Hz. A curve 100 represents an output signal strength of a left channel over a range of frequencies. The attenuation is about 3 dBu at about 12 KHz. Likewise, a curve 102 represents an output signal strength of a right channel over a range of frequencies. As indicated, the attenuation is about 3 dBu at about 12 KHz.

Also, both the curves 100 and 102 have the desired flat characteristic, at zero dBu, throughout the range of frequencies. Additionally, the output signal strength drops off very rapidly to prevent interference with the pilot signal at 15.734 KHz.

Figure 6:
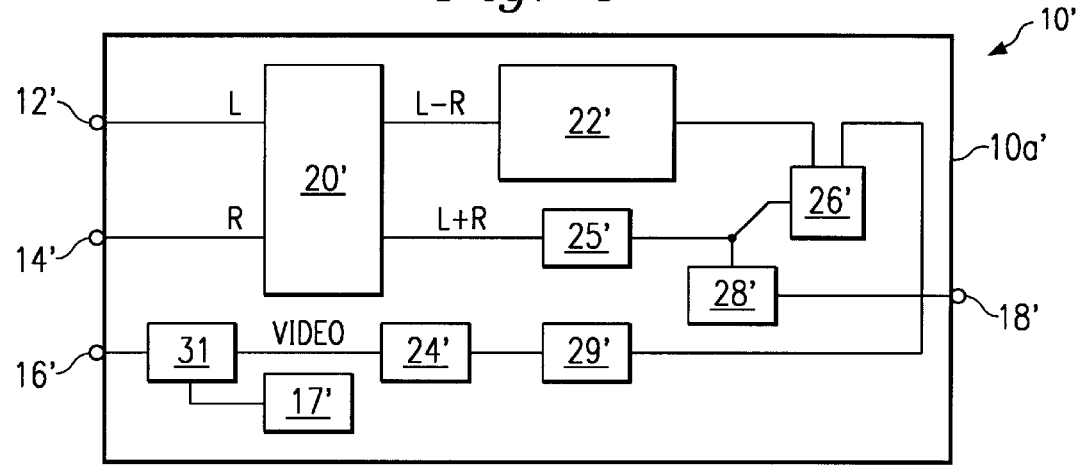
FIG. 6 is a block diagram of an alternate embodiment of the encoder of FIG. 1.

Referring next to FIG. 6, an alternate embodiment of the encoder 10, again constructed in accordance with the teachings of the present invention may now be seen. In this embodiment, encoder 10' includes a left audio input 12', right audio input 14', video input 16', processed audio output 18', ABM 20', SSC 22', VSM 24', L+R low pass clamping filter 25', mixer 26', amplifier 28' and timing circuit 29', all of which operate in a manner identical to that described with respect to the corresponding elements of the encoder 10 illustrated in FIGS. 1–5. In this embodiment, however, the switch 19, the pushbutton 21 and linkage 23 have been removed in favor of a HSYNC frequency detection and selection circuit 31.

The HSYNC frequency detection and selection circuit 31 has a first input coupled to the video input 16', a second input coupled to the secondary video source 17' and an output coupled to the VSM 24'. The video signal generated by the DVD player or other video source and input the encoder 10' is first propagated to the HSYNC frequency detection and selection circuit 31. There, the circuit 31 measures the frequency of the HSYNC signal contained within the received composite video signal. If the frequency of the HSYNC signal is 15.734 KHz, the received composite video signal is passed on to the VSM 24' and the encoder 10' operates identically to the manner previously described. If, however, the HSYNC signal has a frequency other than 15.734 KHz, for example, if the frequency of the HSYNC signal is 15.790 KHz, the HSYNC frequency detection and selection circuit 31 will pass the video signal generated by the secondary video source 17 to the VSM 24. In one configuration, the circuit 31 will continue to pass video signal generated by the secondary video source 17' until an interruption of the composite video signal received via the video input 16 is detected. Upon an interruption of the video signal received via the video input 16', for example, when the DVD player or other video signal source is turned off, the circuit 31 will return to its initial state where the signal received at the video input 16' is passed to the VSM 24'. In an alternate configuration, the circuit 31 will periodically measure, for example, once every five minutes, the frequency of the HSYNC signal contained in the composite video signal received at the video input 16'. If the circuit 31 determines that the frequency of the video signal received via the video input 16' has returned to 15.734 KHz, the circuit 31 returns to it's initial condition where the composite video signal received at the video input 16' is passed to the VSM 24'.

Figure 7:
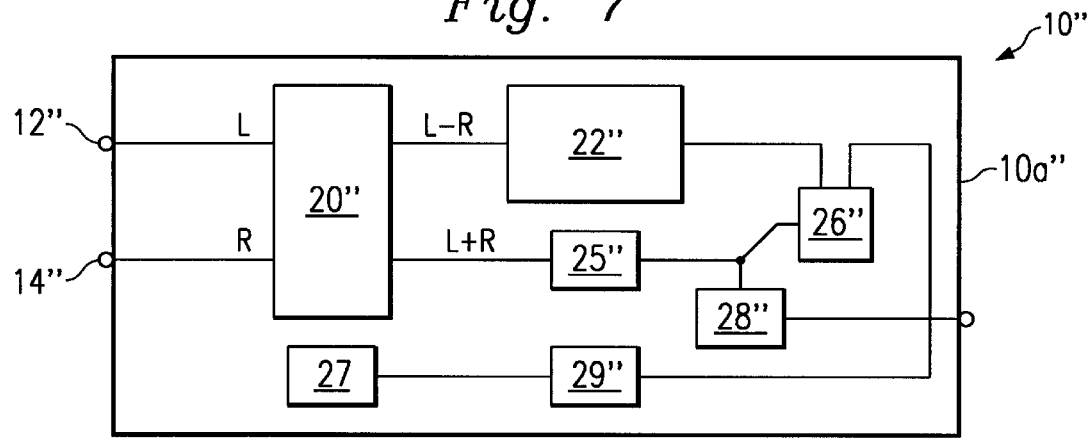
FIG. 7 is a block diagram of another alternate embodiment of the encoder of FIG. 1.

Referring next to FIG. 7, yet another alternate embodiment of the encoder 10, again constructed in accordance with the teachings of the present invention may now be seen. In this embodiment, the encoder 10" includes a left audio input 12", right audio input 14", video input 16", processed audio output 18", ABM 20", SSC 22", L+R low pass clamping filter 25", mixer 26", amplifier 28" and timing circuit 29", all of which operate in a manner identical to that described with respect to the corresponding elements of the encoder 10 illustrated in FIGS. 1–5. In this embodiment, however, the secondary video signal source 17, the switch 19, the pushbutton 21, the linkage 23 and the VSM 24 have been removed in favor of a local clock 27 which outputs a clock pulse having a frequency of 15.734 KHz to the timing circuit 29".

Unlike the encoders 10 and 10', the encoder 10" does not require a video input from the video source. Instead it receives only audio input signals, specifically, the left audio input signal and the right audio input signal from the video and audio signal generator. As the video signal is no longer needed as an input thereto, the encoder 10" is thusly simplified. Furthermore, as the clock 27 generates the pulse sequence used to properly synchronized the composite audio output signal generated thereby, the VSM 24 is no longer needed. Instead, the clock pulse may be propagated directly to the timing circuit 29". Thereafter, however, the encoder 10" operates in a fashion identical to the encoders 10 and 10'.

Although illustrative embodiments have been shown and described, a wide range of modifications, changes and substitutions are contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An audio adapter for coupling a video/audio signal generator to an audio reproduction system, comprising:

a first audio input for receiving a left audio signal from said video/audio signal generator;

a second audio input for receiving a right audio signal from said video/audio signal generator;

an audio signal processor, coupled to said first and second audio inputs, said audio signal processor generating a composite audio signal clocked to a selected frequency for output to said audio reproduction system;

a video input for receiving a primary video signal from said video/audio signal generator, said primary video signal having a first signal embedded therein;

an internal video signal source having an output, said internal video signal source generating a secondary video signal having a second signal embedded therein the frequency of which matches said selected frequency; and a switch for selectively coupling said video input or said output of said internal video signal source to said audio signal processor whenever the frequency of the first signal fails to match said selected frequency;

said audio signal processor clocking said composite audio signal to the frequency of said first signal when said video input is coupled to said audio signal processor and clocking said composite audio signal to the frequency of said second signal when said secondary video signal is coupled to said audio signal processor.

2. The adapter of claim 1 wherein the first signal is a horizontal synchronization signal.

3. The adapter of claim 1 wherein said primary video signal contains copy protection features which shift the frequency of the first signal embedded therein to a shifted frequency which differs from said selected frequency.

4. The adapter of claim 3 wherein said selected frequency is 15.734 KHz.

5. The adapter of claim 4 wherein said shifted frequency is 15.790 KHz.

6. For a surround sound television system which includes a video/audio signal generator, a video display and an audio reproduction system, a method for generating a composite audio signal for transmission to said audio reproduction system, comprising the steps of:

generating, using said video/audio signal generator, a left audio signal, a right audio signal and a video signal having a first signal embedded therein;

determining if said video signal is copy protected;

said first signal embedded in said video signal having a first frequency if said video signal is not copy protected and having a second frequency if said video signal is copy protected;

generating a second signal having said first frequency;

producing a composite audio signal clocked to said first signal if said video signal is not copy protected; and producing a composite audio signal clocked to said second signal if said video signal is copy protected.

7. The method of claim 6 wherein said second signal is a clock signal.

8. The method of claim 6 wherein said second signal is a horizontal synchronization signal embedded within a second video signal.

9. The method of claim 8 wherein said first frequency is 15.734 KHhz and said second frequency is 15.790 KHz.

* * * * *

UNITED STATES PATENT AND TRADEMARK OFFICE
CERTIFICATE OF CORRECTION

PATENT NO. : 6,288,747 B1      Page 1 of 1
DATED : September 11, 2001
INVENTOR(S) : Sealtiel Avalos, Robert D. Kaylor and Robert F. Kessler It is certified that error appears in the above-identified patent and that said Letters Patent is hereby corrected as shown below:

<u>Column 23,</u>
Line 44, change "17.734" to -- 15.734 --.
Line 52, change "17.890" to -- 15.890 --.
Line 56, change "17.734" to -- 15.734 --.

<u>Column 6,</u>
Line 20, change "31.768" to -- 31.468 --.

Signed and Sealed this

Seventh Day of May, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,288,747 B1
DATED : September 11, 2001
INVENTOR(S) : Sealtiel Avalos, Robert D. Kaylor and Robert F. Kessler It is certified that error appears in the above-identified patent and that said Letters Patent is hereby corrected as shown below:

<u>Title page,</u>
Item [73], change the assignee city to -- Garland, TX --.

Signed and Sealed this

Twentieth Day of August, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,288,747 B1
DATED         : September 11, 2001
INVENTOR(S)   : Sealtiel Avalos, Robert D. Kaylor and Robert F. Kessler It is certified that error appears in the above-identified patent and that said Letters Patent is hereby corrected as shown below:

<u>Title page,</u>
Item [73], change the assignee city to -- Garland, TX. --

Signed and Sealed this

Twenty-first Day of January, 2003

JAMES E. ROGAN
*Director of the United States Patent and Trademark Office*